Figure 1:
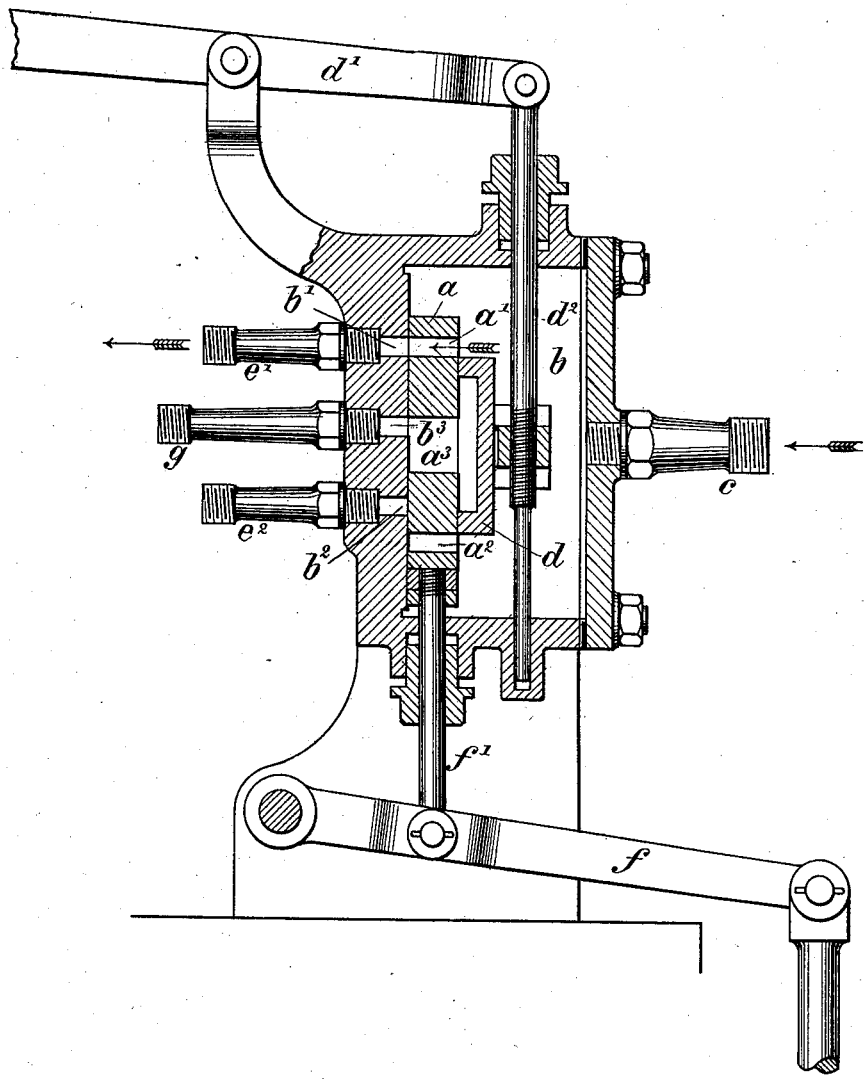

(No Model.) 5 Sheets—Sheet 1.
J. W. HERQUET.
APPARATUS FOR INDICATING THE DIRECTION OF ROTATION OF STEAM ENGINES.

No. 374,067. Patented Nov. 29, 1887.

Witnesses:
C. T. Belt
Job Barnard

Inventor
Joseph W. Herquet.
By Paine & Lord,
Atty's.

N. PETERS, Photo-Lithographer, Washington, D. C.

(No Model.)  
J. W. HERQUET.  
APPARATUS FOR INDICATING THE DIRECTION OF ROTATION OF STEAM ENGINES.

No. 374,067. Patented Nov. 29, 1887.

Witnesses:  
C. T. Belt  
Job Barnard

Inventor.  
Joseph W. Herquet.  
By Paine & Ladd,  
Atty's.

(No Model.)

J. W. HERQUET.

APPARATUS FOR INDICATING THE DIRECTION OF ROTATION OF STEAM ENGINES.

No. 374,067. Patented Nov. 29, 1887.

5 Sheets—Sheet 3.

Witnesses:
C. F. Bell
Job Barnard

Inventor
Joseph W. Herquet.
By Paine & Ladd,
Atty's.

(No Model.)   5 Sheets—Sheet 4.

J. W. HERQUET.
APPARATUS FOR INDICATING THE DIRECTION OF ROTATION OF STEAM ENGINES.

No. 374,067.   Patented Nov. 29, 1887.

Witnesses:
C. T. Beer
Job Barnard

Inventor:
Joseph W. Herquet.
By Paine & Ladd,
Atty's.

(No Model.)  
J. W. HERQUET.  
APPARATUS FOR INDICATING THE DIRECTION OF ROTATION OF STEAM ENGINES.

No. 374,067. Patented Nov. 29, 1887.

Witnesses:
C. J. Bell
Job Barnard

Inventor.
Joseph W. Herquet.
By Paine & Ladd,
Atty's.

UNITED STATES PATENT OFFICE.

JOSEPH WILHELM HERQUET, OF ALTONA, PRUSSIA, GERMANY, ASSIGNOR OF ONE-HALF TO IGNATZ FURTH, OF COLON, UNITED STATES OF COLOMBIA.

APPARATUS FOR INDICATING THE DIRECTION OF ROTATION OF STEAM-ENGINES.

SPECIFICATION forming part of Letters Patent No. 374,067, dated November 29, 1887.

Application filed May 17, 1887. Serial No. 238,502. (No model.) Patented in Germany January 1, 1886, No. 37,772, and August 23, 1886, No. 38,655; in France June 2, 1886, No. 176,525, and in England June 2, 1886, No. 7,420.

*To all whom it may concern:*

Be it known that I, JOSEPH WILHELM HERQUET, a subject of the German Emperor, and a resident of Altona, in the Kingdom of Prussia and German Empire, have invented certain new and useful Improvements in Apparatus for Indicating the Direction of the Rotation of Steam-Engines, (for which I have obtained German patents, No. 37,772, dated January 1, 1886, and No. 38,655, dated August 23, 1886; French patent, No. 176,525, dated June 2, 1886, and English patent, No. 7,420, dated June 2, 1886,) of which the following is a specification.

The improvements serve to indicate the direction of the rotation of the main shaft of steam-engines, and will be of the most practicable use for controlling the direction of rotation of marine engines from a point where the engine cannot be seen.

An improved apparatus constructed according to my invention consists, substantially, of a supplementary slide-box which is connected with the main steam-distributing mechanism, with the reversing-gear, and with an indicating device. Inside the box slides an ordinary slide-valve provided with passages for the admittance and exhaust of steam, which is connected with a reciprocating moving part of the main steam-distributing mechanism, thus participating of the motion of the latter. A slide connected to the reversing-gear lever opens and closes, according to the position of the reversing-gear, one of the two passages of the slide-valve corresponding with suitable channels of the slide-box, wherefrom pipes go to the indicating device. As the slide-box is supplied with steam either from the boiler directly or indirectly, such steam will pass to the indicating device through the channel just opened by the slide, thus causing the hand or hands of the indicating device to oscillate to the right or left hand side from the normal position. An exhaust-pipe corresponding with a suitable channel in the slide-valve allows the steam to escape from the apparatus after it has done its work of deviating the hand of the indicator.

In order to make my invention more clearly understood, I will describe it with reference to the accompanying drawings, in which—

Figure 2:
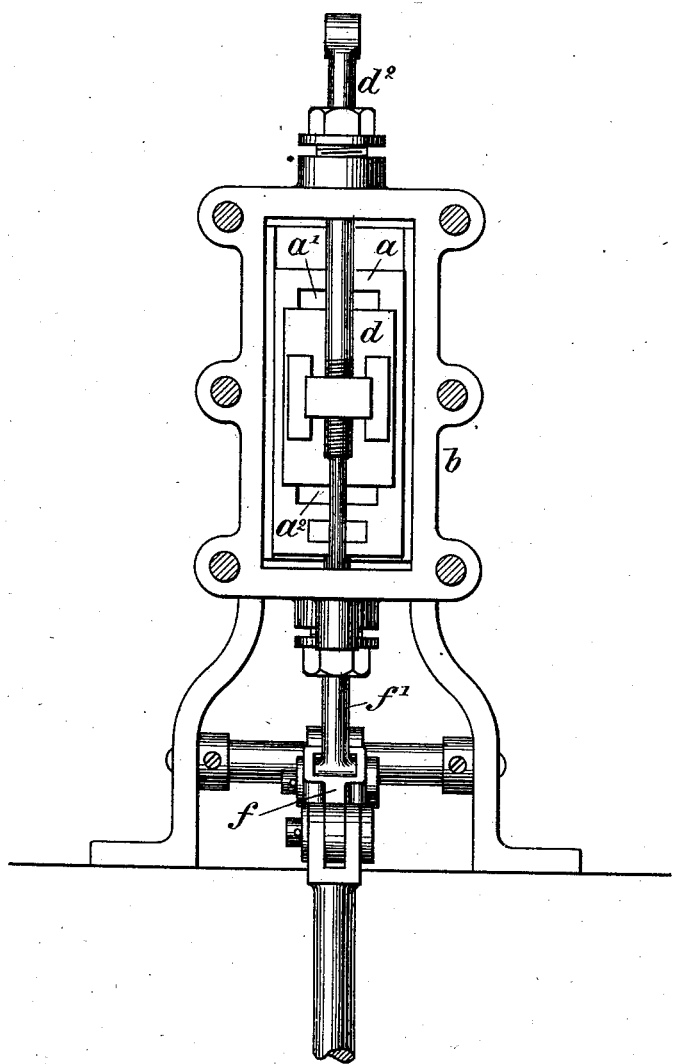
Figure 3:
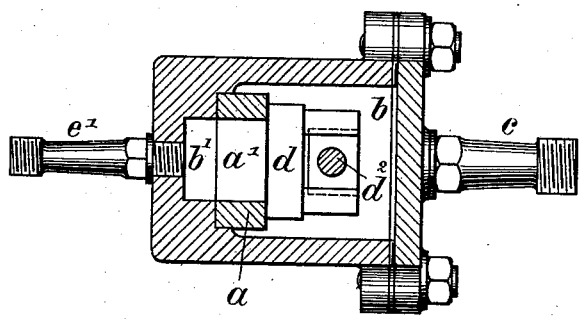
Figure 4:
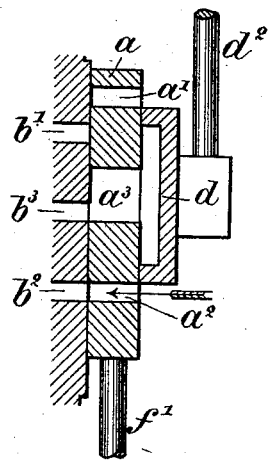
Figure 5:
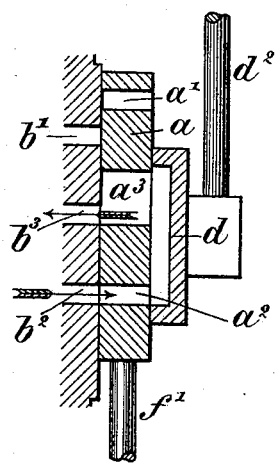
Figure 6:
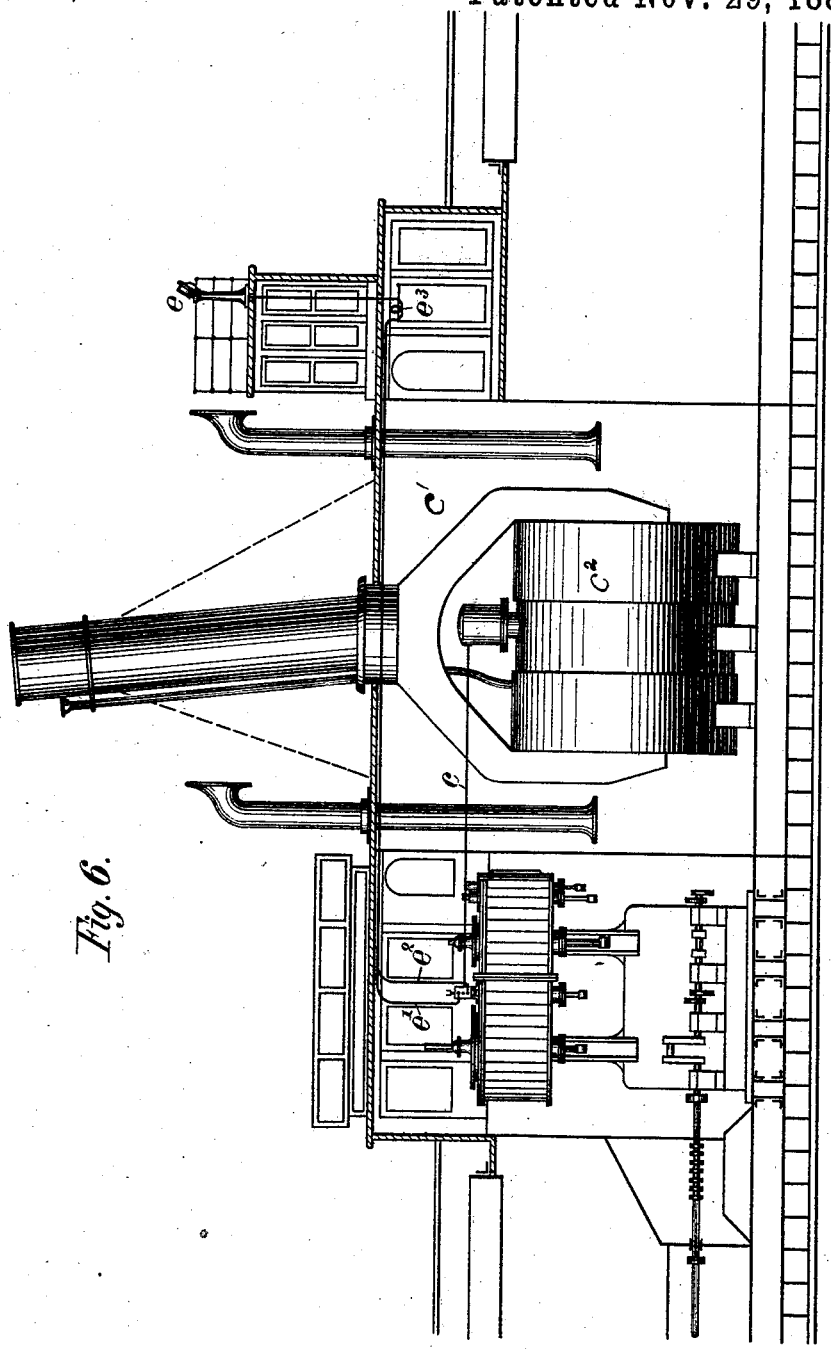
Figure 7:
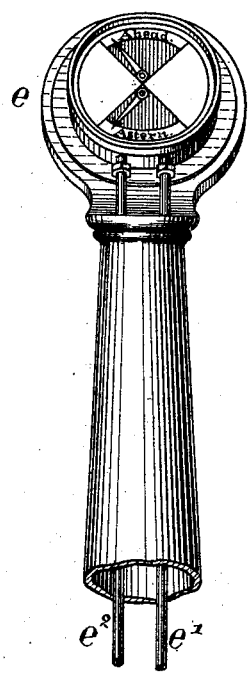
Figure 8:
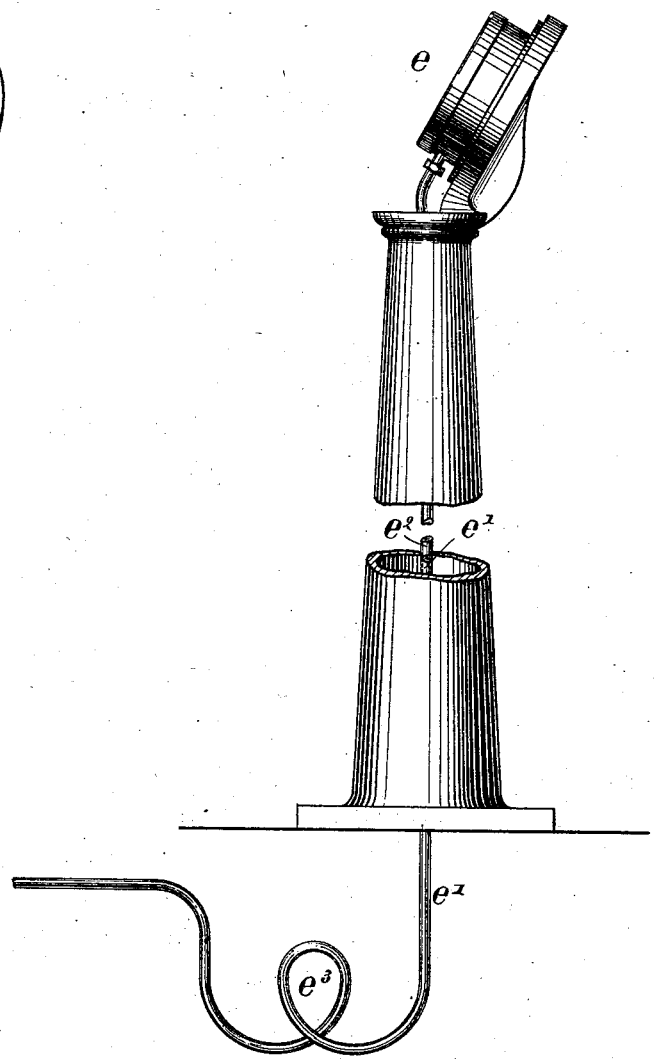

Figure 1 is a sectional side elevation of my improved apparatus, and Fig. 2 a front view thereof, the slide-box cover being removed in the latter figure. Fig. 3 is a sectional top view, and Figs. 4 and 5 are diagrams of two different positions of the working parts. Fig. 6 shows the manner of applying the said apparatus in a steamship, and Figs. 7 and 8 are detailed views of the indicating device.

Similar letters refer to similar parts throughout the several views.

$a$ is the slide-valve, provided with the channels $a'$ and $a^2$, connecting the valve-box $b$ with the indicator and the exhaust-channel $a^3$. Corresponding passages, $b'$, $b^2$, and $b^3$, are arranged in that side of the valve-box $b$ whereon the valve $a$ slides.

$c$ is the pipe through which the steam enters the valve-chest. The slide $d$ is attached by its rod $d^2$ to the lever $d'$, suitably connected with the steam-distributing device of the engine.

The pipes $e'$ $e^2$ connect the passages $b'$ $b^2$, respectively, with the indicator $e$. They may suitably form at one part of their length a curvature or loop, $e^3$, as shown in Figs. 6 and 8, in order to be filled at such loop with a liquid—as, for instance, mercury—separating the water in that part between the curvature $e^3$ and the valve-chest $b$ from the liquid in the pipe between $e^3$ and the indicator $e$. The latter liquid may be suitably one which is not susceptible to freezing, as in ships the upper part of the pipes $e'$ $e^2$ will be ordinarily exposed to the influences of the atmospheric temperature. When such influences are not to be feared, the curvature or loop $e^3$ may be omitted.

$f$ is the lever which communicates, by means of the rod $f'$, the motion of the reversing-gear to the valve $a$.

$g$ is the exhaust-pipe.

The operation of my improved apparatus is as follows: The steam, entering from the boiler through the pipe $c$ into the box $b$, passes at the one stroke of the shell-slide $d$, according to the position of the slide-valve $a$, either into the pipe $e'$, as shown in Fig. 1, or $e^2$, as shown in Fig. 4, and advances thereby the column of liquid contained in the respective pipe toward the indicator, thus causing a corresponding deviation of the hands. At the return movement of the slide $d$, the steam, after doing its work, is allowed to escape through the interior of the shell-slide $d$, the port $a^3$ of the slide-valve, and the passage $b^3$ of the slide-box into the exhaust-pipe $g$, as shown in Fig. 5.

The indicator employed may be constructed similar to an ordinary pressure-gage with two expanding tubes which operate upon one hand, or each tube may actuate a separate hand. Sometimes I also connect the valve $a$ with the steam-distributing device of the engine and the slide $d$ with the reversing-gear. In such case the channel $a^3$ should not pass through the valve $a$, but form only a long excavation therein, which may bring the exhaust-channel in communication with one of the channels $a'$ or $a^2$. By making use of this modification the hand of the indicator will not show immediately after the engine begins to work the rotation of the same, as the air must be compressed within the pipes $e'\ e^2$ to a certain degree, while in the first modification the water in the pipes $e'\ e^2$ will transfer the pressure of the steam to the indicator, the water not being liable to be compressed.

By reference to Fig. 6 it will be noted that the chest $b$ is located on the engine-cylinders in a position to be supplied by steam from the steam-dome $c'$ of the boiler $c^2$, the pipe C leading the steam to said chest and also to the delivery-valve of the cylinders.

Having now particularly described and ascertained the nature of my said invention and in what manner the same is to be performed, I declare that what I claim is—

The combination, in a device for indicating the rotation of steam-engines, of a supplementary valve-chest, $b$, located adjacent to and communicating with the main valve-chest of the engine, said chest $b$ having supply and exhaust openings and openings $b'\ b^2$, as described, the valve $a$ in said chest $b$, having ports $a'\ a^2$ and exhaust $a^3$, a valve, $d$, valve-operating apparatus, and a dial-indicator located on the deck in proximity to the helm and communicating by a pipe or pipes with the said openings $b'\ b^2$, substantially as described.

In testimony that I claim the foregoing as my invention I have signed my name in presence of two witnesses.

JOSEPH WILHELM HERQUET.

Witnesses:
ALEXANDER SPECHT,
HERMANN GASTEN.